July 30, 1929.  R. H. LAWSON  1,722,502
SHOE MACHINE
Original Filed Jan. 16, 1919   8 Sheets-Sheet 5

INVENTOR
Robert H. Lawson
By his Attorney
Nelson W. Howard July 30, 1929. R. H. LAWSON 1,722,502
SHOE MACHINE
Original Filed Jan. 16, 1919   8 Sheets-Sheet 6

July 30, 1929.  R. H. LAWSON  1,722,502
SHOE MACHINE
Original Filed Jan. 16, 1919   8 Sheets-Sheet 7

Patented July 30, 1929.

1,722,502

UNITED STATES PATENT OFFICE.

ROBERT HILLDORF LAWSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

SHOE MACHINE.

Application filed January 16, 1919, Serial No. 539,280. Renewed February 25, 1922.

This invention relates primarily to the lasting or the sewing of shoes, these terms being employed herein in their broad and generic sense except where the context requires a more restricted meaning. The particular machine herein shown to exemplify the invention is one which progressively both lasts and sews an upper to an insole on a last and which operates simultaneously at both sides of the last but in its broader aspects the invention is not thus limited.

In the usual commercial method of lasting the sides of shoes by machine, first the upper is seized by grippers and secured in lasted position progressively along one side of the shoe and thereafter the opposite side of the shoe is similarly lasted so that there is the serious liability that, in the lasting of the first side, the upper will be pulled away from the opposite side to such an extent that it will be impossible to draw the upper back into proper position when the second side is being lasted. Moreover, although lasting machines have heretofore been proposed in which the lasted upper was to be secured in place by stitches, yet in all lasting machines now in commercial use of which applicant is aware, the upper is secured in place by metallic fastenings, such as tacks or wire. In the case of Goodyear welt shoes, which are recognized as the best type of shoes made, the tacks must be removed in a separate operation before the inseaming of the shoe is performed. Hence, there is always a danger that some of the tacks, or at least their points, will be left projecting into the inside of the finished shoe.

One important object of the present invention, therefore, is to provide a practicable machine for lasting shoes in which the upper is lasted and secured in position at opposite sides of the shoe simultaneously by thread fastenings which preferably remain permanently in the shoe and which not only do not interfere with the inseaming and other subsequent operations, as tacks do, but which also reinforce the inseam and materially improve the quality of the shoe. In certain broad aspects, however, some of the advantages of the invention may be secured when fastenings other than thread fastenings are employed.

Accordingly, in the illustrated embodiment of the invention, mechanisms for engaging the upper at opposite sides of a shoe and working it over a last simultaneously at its opposite sides, sewing the upper to the rib of an insole, also simultaneously at the opposite sides, and securing the upper in lasting position are associated with novel means for supporting the shoe and maintaining it in the proper relation to the lasting and sewing instrumentalities.

However, it is to be understood that, as to novel subject-matter disclosed herein and also disclosed in my co-pending application Ser. No. 637,749, filed May 9, 1923, no feature claimed in my said application is claimed herein either generically or specifically.

Accordingly, the invention herein claimed comprises, in its illustrated embodiment, a shoe support which comprises toe and heel rests and a pair of axially alined trunnions connected respectively to said rests with the axis of said trunnions lying approximately in the general plane of the bottom of the shoe. As illustrated, this axis lies approximately along the longitudinal median line of the bottom of the shoe and the work support is acted upon, during the operation of the machine, by yielding means which tends to hold the bottom of the shoe in engagement with one or more abutments on the head of the machine. In the illustrated construction, three vertically immovable abutments are provided and these abutments are so spaced and located that in co-operation with the work support they maintain the bottom of the shoe in the proper relation to the lasting, sewing or other operating tools.

In addition to the features already mentioned, the present invention includes also various combinations and arrangements of machine parts which will now be described in detail and defined in the appended claims.

Referring to the accompanying drawings, which illustrate a machine which constitutes one specific embodiment of the present invention.

Figs. 8 and 9 are side elevations respectively of the two jaws of one pair of grippers;

The illustrated machine, while adapted for lasting shoes made in most respects according to present commercial methods and more specifically for lasting the sides of shoes, the toes and heels of which are lasted upon machines of the so-called "bed" type, has nevertheless been particularly designed to be employed as one unit in a series of automatic machines which are intended primarily to practise a radically new method of making shoes which is disclosed and claimed in an application for Letters Patent of the United States, Ser. No. 476,659, filed in the name of George E. Warren, June 11, 1921, and assigned to the assignee of the present application. According to the method disclosed in that application, the toe and heel of the upper of a shoe are preliminarily molded so as to have approximately their final shape and the heel end of the upper is also permanently secured to the insole before the last is inserted within the shoe. The subsequent step of lasting the sides of the shoe, approximately from the breast line at the heel to the tip line at the toe, is the specific function of the machine herein shown and this machine is substantially automatic in its operation requiring no particular attention or skill upon the part of the attendant.

Figure 1:
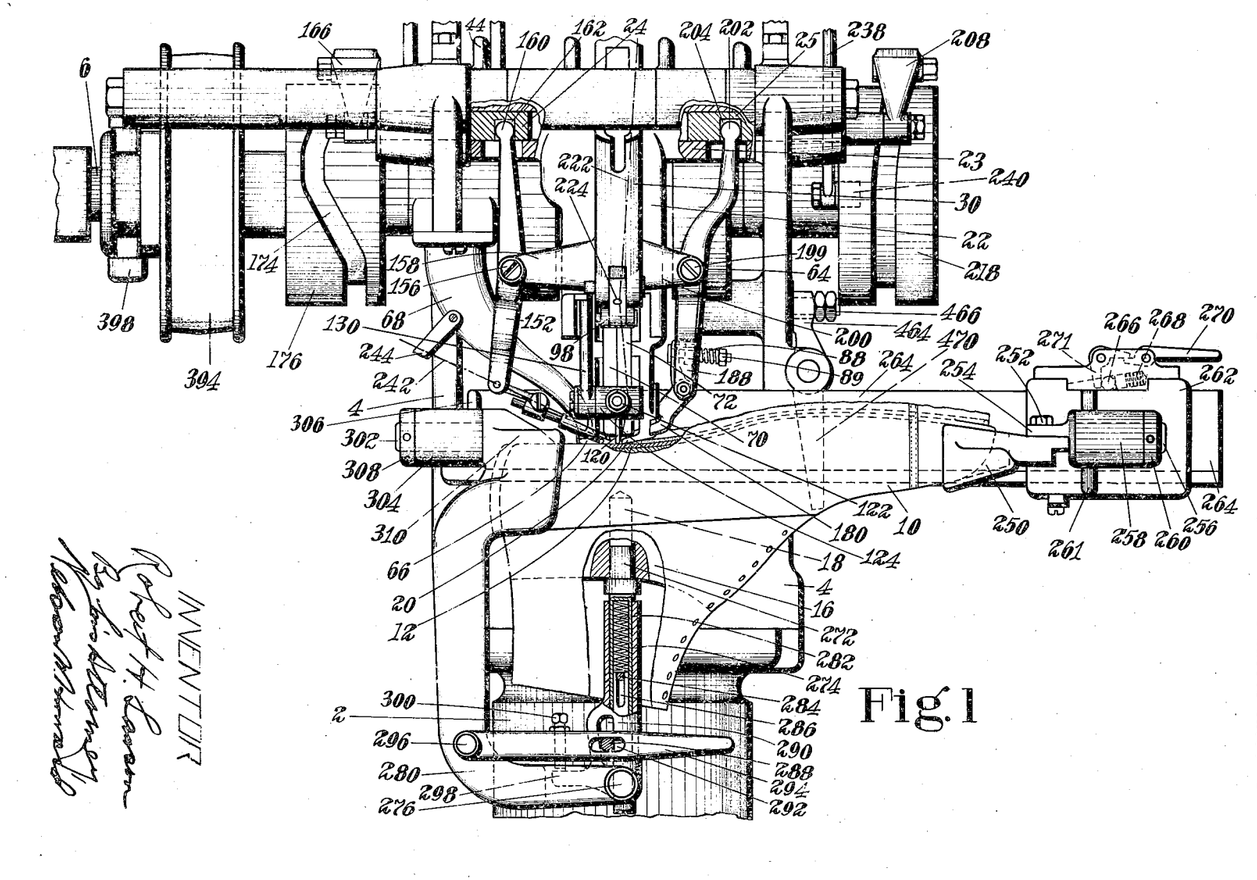
Fig. 1 is a front elevation with certain parts shown in section and with the base and a few of the parts at the top of the machine omitted.

In the accompanying drawings, the machine is illustrated as comprising a column 2 designed to rest upon the floor and support the head 4 of the machine at a convenient height for the operator or attendant. The main or primary power shaft is designated 6. As shown particularly in Figs. 3 and 15, the machine is constructed and operated to last simultaneously the two sides of a welt, or turn, shoe comprising an upper 10, a sole or insole 12 having a sewing rib 14. The shoe is shown as mounted upon a last 16 provided with a pin hole 18 (Fig. 1). Attention is here called to the fact that the gripping and sewing mechanisms, as well as certain other parts which operate at one side of the shoe, are substantially duplicates of the corresponding parts which operate at the opposite side of the shoe so that a description of one set thereof applies also generally to the other set.

Figure 2:
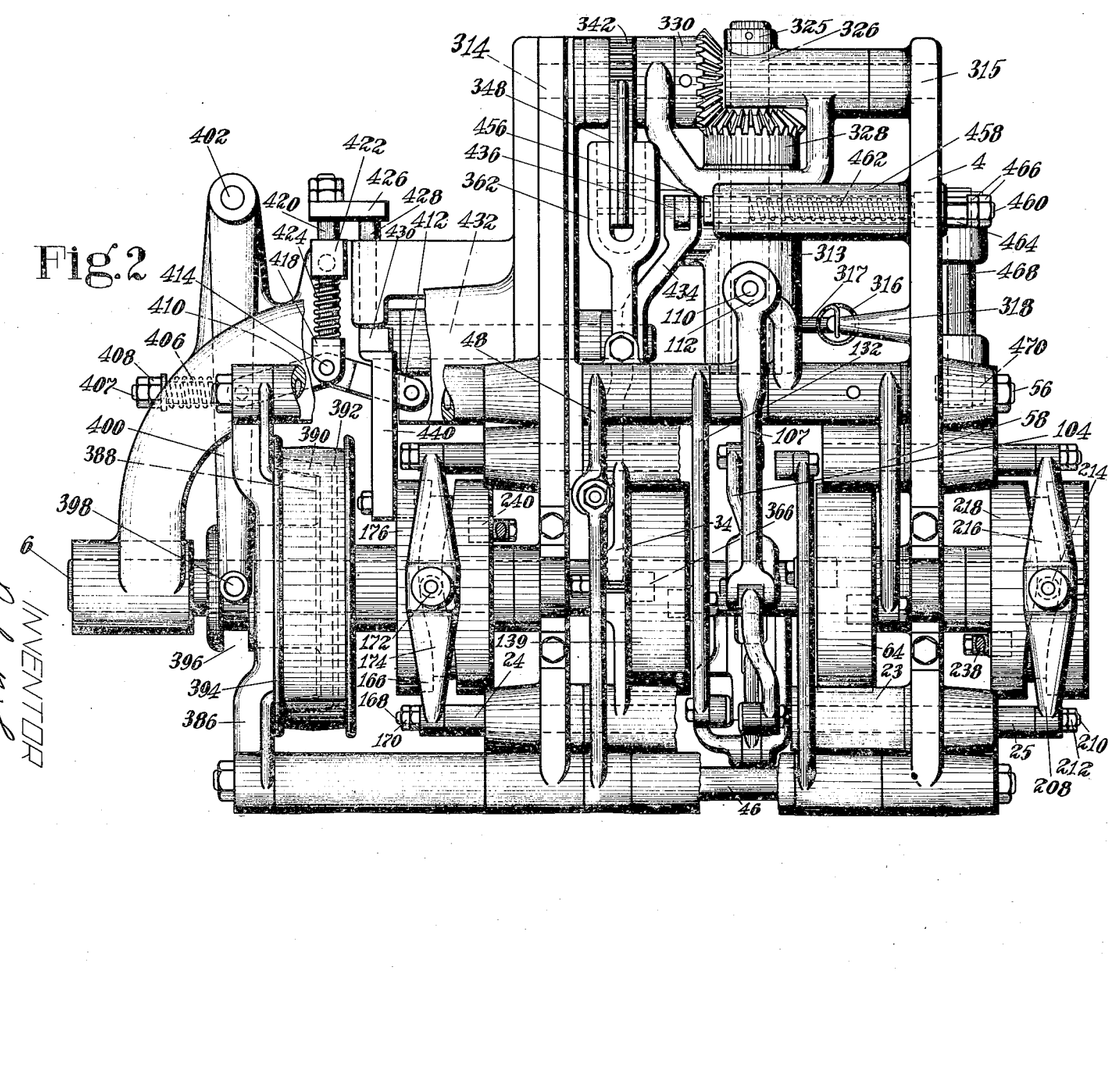
Fig. 2 is a plan with a few parts which would hide others omitted for the sake of clearness.
Figure 3:
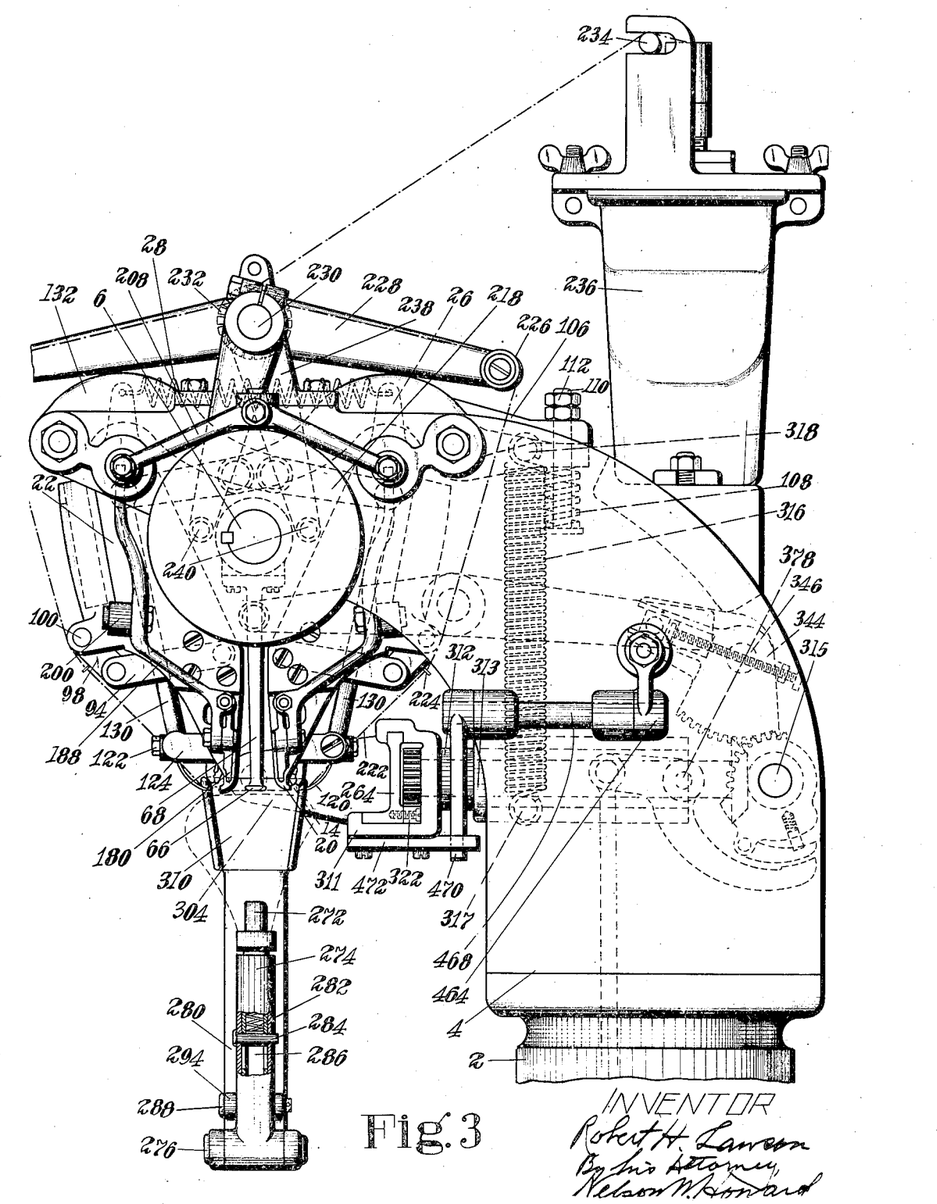
Fig. 3 is an end elevation, the base and the toe rest of the jack being omitted.
Figure 4:
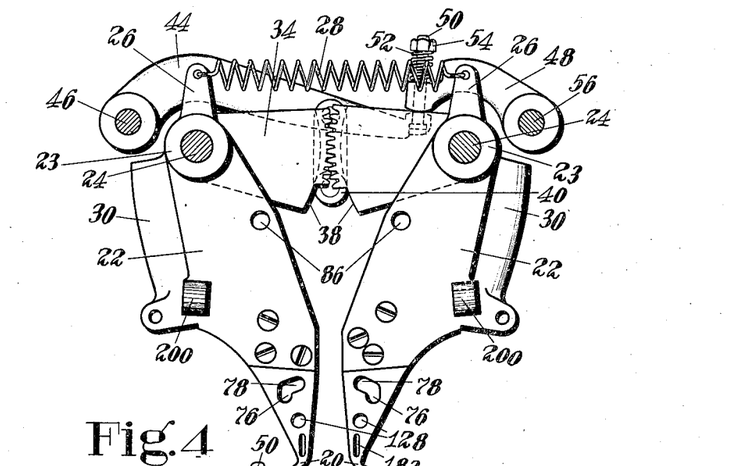
Fig. 4 is a side elevation showing the swinging supports which carry the channel guides and certain other operating parts.
Figures 5, 6:
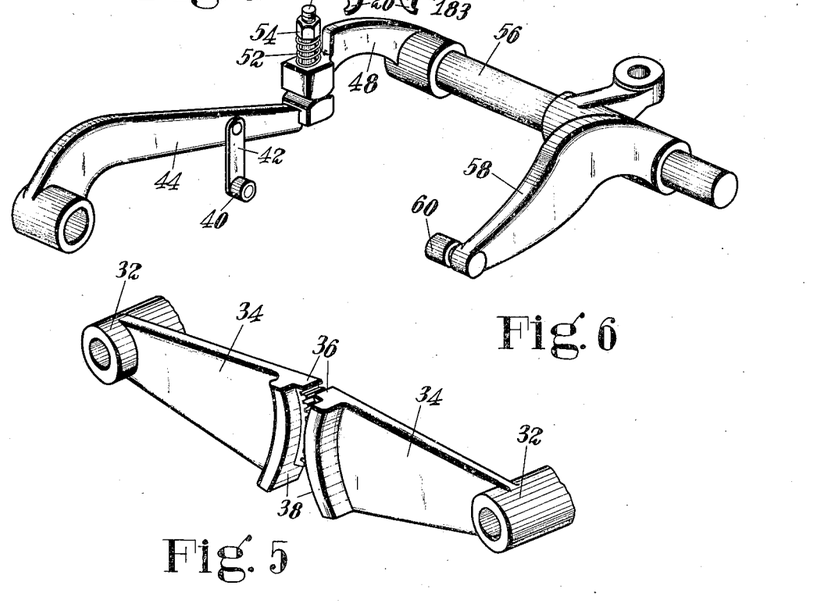
Fig. 5 is a perspective view of some of the parts through which these swinging supports are geared together and locked.
Fig. 6 is a similar view of the locking mechanism.
Figures 7, 11:
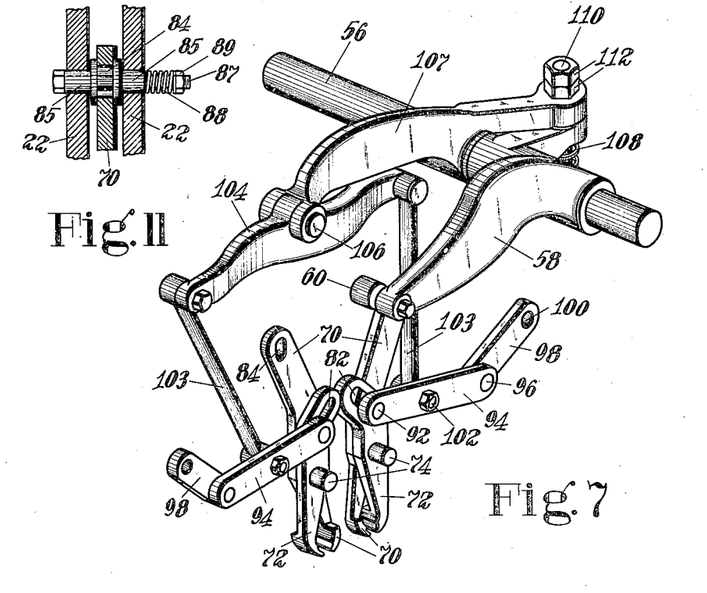
Fig. 7 is a similar view of the gripping mechanism of the machine.
Fig. 11 is a detail in section of one of the friction devices connected to one of the inner jaws.
Figure 8:
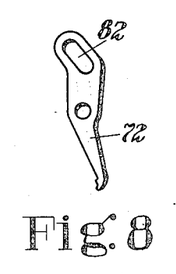
Figure 9:
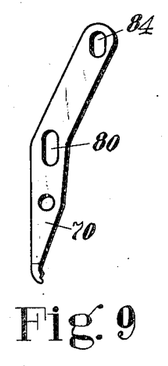
Figure 10:
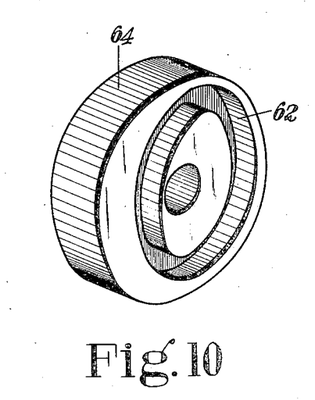
Fig. 10 is a perspective view of the cam which operates the jaws.

Referring now particularly to Figs. 3 and 4 which show part of the mechanism for controlling the position of the shoe, 20 designates two channel guides respectively mounted upon swinging heads or supports 22 having hubs 23 loosely pivoted on rods 24, sustained by the frame 4 of the machine (Fig. 2). Fixed to the swinging supports 22 are short arms 26 connected by a tension spring 28 which tends to separate the two channel guides from each other and, therefore, acts to maintain them laterally in continuous engagement with the inside of the rib 14 of the sole when the shoe, indicated by dotted lines in Fig. 3, is held in operative position. Each support 22 is provided with a socket 30 designed to receive an electrical unit by which the head and the parts carried thereby may be heated, thus facilitating the manipulation of the waxed sewing thread. Fixed respectively to the supports 22 are two arms 34 provided at their inner ends with intermeshing gear segments 36 and also with adjacent cylindrical surfaces 38. In the form of the invention illustrated, mechanism is provided for locking the channel guides positively at certain portions of each cycle of operation against inward movement relative to each other, thus preventing the lateral displacement of the shoe by the sewing mechanism. This locking mechanism is shown particularly in Figs. 4 and 6 and comprises a roll 40 which may be lifted into locking engagement with the two surfaces 38 just referred to. The roll is carried by a link 42 which in turn is pivoted to a lever 44 fulcrumed upon the tie rod 46. The lever 44 is actuated from a lever 48 through a yielding connection comprising a headed bolt 50, a light spring 52 and a nut 54, this construction permitting the arm 48 and the rock shaft 56 upon which it is fixed to continue their movement, for a purpose hereinafter described, even after the roll 40 has become wedged between the two surfaces 38 so that it is thus held against further upward movement. For rocking the shaft 56 an arm 58 is secured thereto and it carries a roll 60 which runs in a cam path 62 of the cam 64 shown separately in Fig. 10. Co-operating with the channel guides 20 to control the longitudinal tip of the shoe is a stationary foot 66 (Figs. 1 and 3) secured to a bracket 68 clamped to the frame of the machine.

Referring now particularly to the gripping mechanism shown in detail in Figs. 7 to 11, each pair of grippers comprises an inner jaw 70 and an outer jaw 72 fulcrumed upon a pin 74 which is movable in an angular guide slot in the channel guide support. This slot, as clearly shown in Fig. 4, comprises a vertical portion 76 and an upwardly and inwardly inclined portion 78. Moreover, the inner jaw has a vertical slot 80 lying at an angle with an inclined slot 82 in the outer jaw. The upper end of the inner jaw is likewise provided with a vertical slot 84 and is acted upon by a friction device shown separately in Fig. 11. This device comprises two flanged sleeves 85 arranged to bear against the two sides of the jaw 70 and fitting so as to be slidable longitudinally in openings 86 in the swinging support 22. A bolt 87 passes through these sleeves 85 and through the slot 84, the friction upon the jaw being produced by a spring 88 which may be adjusted by a nut 89 to secure a sufficiently firm grip of the jaws upon the upper of the shoe.

Figures 12, 13, 14, 15, 16, 17:
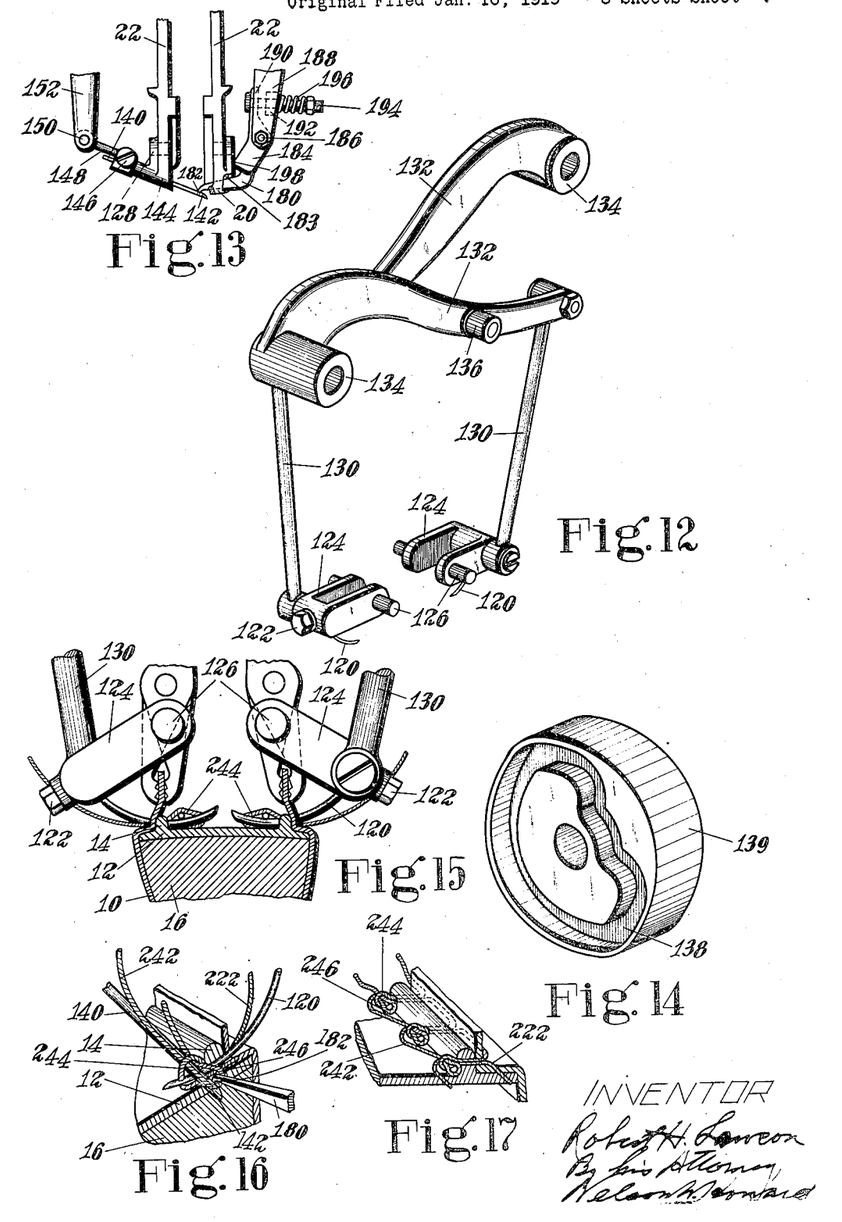
Fig. 12 is a perspective view of the needle mechanism.
Fig. 13 is a front elevation of the looping mechanism.
Fig. 14 is a perspective view of one of the needle actuating cams.
Figs. 15, 16 and 17 are detail views upon a larger scale showing particularly the manner in which the loop lock stitch is formed.

The mechanism for actuating each pair of grippers comprises a pin 92 passing through the two slots 80, 82 and fixed to a link 94 pivotally connected at 96 to another link 98 fulcrumed at 100 upon the swinging support 22. Intermediate its ends the link 94 is pivotally connected at 102 to a rod 103 in turn pivotally connected at its upper end to an equalizing lever 104. As already stated, this gripping mechanism is in duplicate and that for operating on one side of the shoe is connected to one end of the lever 104 while that for the opposite side of the shoe is connected to the other end and the middle of the lever is connected at 106 to an actuating lever 107 loosely mounted upon the rock shaft 56. The rear end of this lever is yieldingly connected through a relatively heavy spring 108 and bolt 110 to the rear end of the lever 58 through which the locking mechanism for the swinging supports is operated as above explained. The initial compression of the spring 108 may be adjusted through nuts 112. The cam path 62 in the cam 64 is so shaped and the gripping mechanism just described is so constructed that during the first part of the upward movement of the lever 104 the inner jaws 70 are held stationary by the friction devices 85 while the movement of pin 92 in slot 82 causes the outer jaw 72 to move inward to grasp the upper presented between the jaws as shown in Fig. 15, the lateral position of the jaws being determined by the engagement of the channel guides 20 with the rib 12 of the insole and the two pins 74 remaining in the vertical portions 76 of the angular slots in the channel guide support. Moreover, during such upward movement, the roll 40 will come into the engagement with the surfaces 38 and lock the channel guides against inward movement and the guides will remain locked until the grippers have been returned toward initial position. Continued movement of the gripping mechanism is permitted, however, by the yielding connection including spring 52. Moreover, by adjustment of the nut 54 the lever 48 may be permitted to move more or less before such locking takes place and hence the period during which the lock 40 is operative may be varied.

As will later be explained, the needles are slightly offset so as to enter the rib out of line with each other in order to avoid any possible interference of the needles with each other and hence the locking mechanism just described insures against any inward movement of either of the channel guides, and the sewing mechanism carried thereby, during the formation of the stitch. However, it is to be noted that the tendency of one needle to displace the work laterally is substantially neutralized by the action of the other needle and, therefore, it is believed that the machine would operate satisfactorily upon most classes of work if this locking mechanism were entirely omitted.

If for any reason one pair of grippers completes its closing movement before the other, no substantial "updraw" will take place until the other gripper is closed because the equalizing lever 104 will swing about its fulcrum 106. Thereafter the continued movement of the cam actuated lever 58 overcomes the resistance of the friction devices (Fig. 11) and then the two jaws of each pair of grippers move vertically as a unit. As soon as each pin 74 moves out of the vertical portion 76 of its guide slot and into engagement with the upper surface of the inclined portion 78 of that slot, the jaws move inwardly as well as upwardly and thus carry the upper over the edge of the sole and against the sewing rib 12, as shown in Fig. 15, drawing and stretching the upper over the last 16, exerting a pull the ultimate strength of which is determined by the pressure of spring 108 inasmuch as the co-operating parts are so shaped and adjusted that the spring 108 yields before the positive cam-effected throw of lever 58 is completed. The jaws hold the upper thus in lasted position while it is being secured by the sewing mechanism to the rib simultaneously at the opposite sides of the sole.

This sewing mechanism is shown in detail in Figs. 12 to 16. At each side of the shoe there operates a curved eye needle 120 which is clamped by a screw 122 to its carrier or segment 124. Each carrier is bifurcated so that jaws 70, 72 may move within it in the plane of the needle path and is provided with trunnions 126 to engage bearings 128 in the swinging supports 22, each of which comprises back and front plates as shown particularly in Fig. 13. Each needle segment is pivotally connected to one end of a pitman 130 likewise pivotally connected at its other end to a lever 132 which carries a roll or stud 136 to engage a cam path. The hubs 134 of the levers 132 are fulcrumed upon the rod 46 and the rock shaft 56 respectively. The cam path 138 for the front needle is formed in a cam 139 shown separately in Fig. 14 and in another view in Fig. 20. The similar cam path for the rear needle is formed in the opposite sides of the cam 64 from the cam path 62 by which the grippers are actuated.

The particular mechanism which co-operates with each needle in the formation of the loop lock seam is separately shown in Fig. 13 and comprises a looper 140 provided with an eye 142 through which the locking thread passes. The looper is guided by a hole in a boss 144 at the lower end of one of the swinging supports 22 and is pivoted at 146 to a link 148 which in turn is pivoted at 150 to a swinging lever 152 centrally pivoted at 156 (Fig. 1) to a bracket 158 on the swinging support 22. The lever 152 has a rounded upper end 160 fitting a recess 162 in the sliding rod 24 upon which the swinging support 22 is pivoted. This rod is moved axially by a bar 166 (Fig. 2) the end of which is bored to fit the reduced end 168 of the shaft, longitudinal movement of the shaft relative to the bar being prevented by nuts 170. The bar 166 and consequently the looper 140 are reciprocated through a cam roll 172 on the bar which engages a cam path 174 of a cam 176 on the main power shaft 6. (See also Fig. 28.)

The looping mechanism comprises also a thread retaining finger 180 having a hooked end 182 guided in a slot 183 in the channel guide 20. This finger is secured to a block 184 pivoted at 186 to the lower end of a lever 188. The upper end 190 of the block is normally held in engagement with a lug 192 upon the lever 188 through a bolt 194 and spring 196 but, as shown in Figs. 1 and 13, an edge 198 of the block is constructed and arranged to contact with one side of the channel guide support 22, thus causing the block 184 to swing about its pivot during the continued movement to the left of lever 188, thus projecting the hooked end 182 of the finger into the loop thrown out by the looper 140 as shown clearly in Fig. 16. The lever 188 is pivoted at 199 (Fig. 1) to a bracket 200 projecting from the swinging support 22 and, like lever 152, has a rounded end 202 fitting a recess 204 in the rod 25 which is actuated (Fig. 2) from another sliding bar 208, the connection comprising a stud 210 and nuts 212 at the end of the shaft. This bar carries a cam roll 214 engaging a cam path 216 in a cam 218 at one end of the main power shaft 6.

As shown in Figs. 1 and 3, the needle thread 222 is led to the needle through a guide eye 224, conveniently mounted upon the link 98, and is carried over a truck 226 on the end of a take-up lever 228 fulcrumed at 230 and thence around a tension wheel 232 and over a truck 234 to a wax pot 236. The arm 228 with another arm 238 constitutes a bell crank lever which is actuated through a roll 240 by a cam. As shown in Fig. 2, the roll for the take-up on one side of the machine engages a cam path in the left side of the cam 218 above mentioned while the roll for the other take-up engages a cam path in the right side of the cam 176 which operates the looper. It is contemplated that the locking thread, designated 242, will not be waxed. It therefore will be led to the looper through guide 244 direct from a ball or cop supported at any convenient place upon the machine.

The manner in which the sewing mechanism operates is best illustrated in Figs. 13, 15, 16 and 17. It is to be noted that the needles and loopers, as well as the grippers, are all supported or guided by the swinging supports 22 and the actuating connections for all of these parts are so constructed and arranged that the swinging supports can move freely inward or outward to follow the insole rib without causing any substantial movement of any of the sewing devices or of the grippers with relation to each other. Thus the stitch will be formed in precisely the same manner when the mechanisms are operating in the relatively narrow shank of the shoe as when they are operating at the wider forepart. After the upper has been stretched over the last and drawn against the rib 14 of the insole and while it is still held under tension, as illustrated in Fig. 15, the two needles are actuated to carry a loop of thread through the upper and rib at each side of the shoe. Preferably the needles penetrate the rib at the inside thereof substantially in the angle formed by the rib and the body of the sole but enter somewhat above the angle at the outside of the rib so that the stitches will not be visible when the shoe is finished. Since each needle is carried by the same support as its co-operating channel guide the resistance of the work to the entrance of the needle tends to press the channel guide even more firmly against the inside of the sewing rib causing the needle and guide to pinch the work between them. In order to avoid any possibility that the end portions of the two needles may come into contact with each other particularly when operating on a narrow shank, one needle is laterally offset relative to the other a distance slightly greater than its diameter, as has already been suggested.

Each needle 120 retracts slightly and then stops, thus throwing out a loop 244 in the main sewing thread 222 into which the looper 140 carrying the looping thread is projected. Then the looper 140 retracts and itself throws out a loop 246. Meanwhile the thread finger 180 has been brought into position opposite the opening in the loop 246 by the movement of the lever 188 while the lug 192 has continued in engagement with the tail end 190 of block 184. The edge 198 of the block now comes into engagement with the side of the support 22 so that further movement of the lever 188 to the left, as shown in Figs. 1 and 13, causes the hook 182 of the finger to be projected into the loop 246, as shown in Fig. 16. The retraction of the needle is then completed, tightening loop 244 about loop 246, and the movement of lever 188 to the right away from the support 22 causes the hooked end of the finger to be withdrawn quickly by spring 196 directly from the loop 246 without disturbing the stitch. Finally, the take-up 228 acts to pull further on the main thread 222 so as to set the stitch and bind the upper firmly to the rib of the sole, somewhat as shown in Fig. 17.

It will be noted that each looping mechanism moves substantially parallel to the rib and close to it so that a minimum space is required inside the rib. Hence, two of such mechanisms can operate simultaneously at opposite sides of a shoe, even in the shank, without interference while, on the other hand, the usual types of looping mechanism could not so operate.

The jack, or shoe support, is shown particularly in Figs. 1 and 3. The rest 250 for the toe of the shoe is pivotally connected by a screw 252 to a lug 254 on the head of a rotatable shouldered stud or trunnion 256 supported in a boss 258, the stud being retained in the boss by a washer 260 pinned to the stud. The boss 258 is carried at the end of an arm 261 which projects forwardly from a slide 262 movable longitudinally of a supporting bar 264. As illustrated in Fig. 3, the arm and toe rest are removed from the machine to show the parts behind. The slide 262 is normally locked against movement to the left as shown in Fig. 1 by a roll clutch 266, the roll being pressed into locking position by a spring 268 but being releasable by the operator through depression of a hand lever 270 and a bell crank lever 271.

The heel end of the shoe is supported by a shouldered last pin 272 which engages the hole 18 in the last on which the shoe is mounted. This pin is vertically movable in a sleeve 274 pivoted at 276 to a bracket 280 and is normally pressed upward with relation to the sleeve 274 by a spring 282 bearing at its upper end against the end wall of a central hole in the last pin and at the other end against a transverse pin 284 which passes through holes in the wall of the sleeve and through slots in the wall of the last pin and which therefore prevents the last pin from sliding wholly out of the sleeve. Furthermore, means is provided for locking the last pin against depression under the force exerted upon the shoe by the operating tools and for holding the shoe firmly clamped in the jack. This means comprises a clutch in the form of a roll 288 extending transversely through a tapered slot 290 in the sleeve 274 and normally wedged between the side of the last pin and the inclined wall of the slot. The roll 288 extends also through a slot 292 in a lever 294 pivoted at 296 to the bracket 280. The attendant may release the clutch by lifting lever 292. However, after the toe rest has been moved to the right from the position shown in Fig. 1, the clutch roll will also be automatically released as the attendant swings the shoe and last pin forward about the fulcrum 276, such release being effected by the engagement of a lateral extension 298 of the sleeve 274 with the end of a set screw 300 in lever 294, thus raising the lever and the roll 288.

The bracket 280 is provided at its upper end with a trunnion 302 supported in a boss 304 at the end of an arm 306 corresponding to the arm 261 already mentioned, trunnion 302 being axially alined with trunnion 256. Arm 306 projects laterally from the supporting bar 264, a washer 308 pinned to the trunnion securing the heel part of the jack in the boss. Moreover, the bracket 280 has an abutment or lip 310 which is arranged to overlie the heel seat of the shoe and to serve both as a gage for determining the vertical position of the heel end of the shoe and also as an abutment against which the shoe is clamped by the action of spring 282 and clutch 288 just described. The bar 264 is slidable longitudinally in guideways in a block 311 secured to the end of a sleeve or hollow trunnion or shaft 312 (Figs. 3 and 19) which, in turn, is rotatable and also longitudinally movable in a bearing 313 which, at its rear end, is fulcrumed upon two alined shafts 314, 315 supported in the head 4 of the machine. A heavy coiled spring 316 secured at its lower end to a pin 317 projecting from this bearing and at its upper end to the machine head 4 tends constantly to hold the jack in raised position but permits it to be pulled downward about shafts 314, 315 and away from the operating tools so that a shoe may be removed from the jack or placed therein. With this construction it will be noted that the jack is permitted to move in a vertical direction about shafts 314, 315, also both in and out and to tip longitudinally as sleeve 312 slides and turns in bearing 313, and finally to tip laterally about the trunnions 256, 302. Moreover, as shown in Figs. 1 and 3, the longitudinal axis about which the jack moves lies approximately in the outer face of the insole while the transverse axis lies slightly above that face and longitudinally between the channel guides 20 and the foot 66 and, hence, the correct position of the shoe with relation to the operating tools is determined by the three point bearing constituted by channel guides 20 and foot 66.

Figures 18, 19, 20, 21, 22, 23, 24:
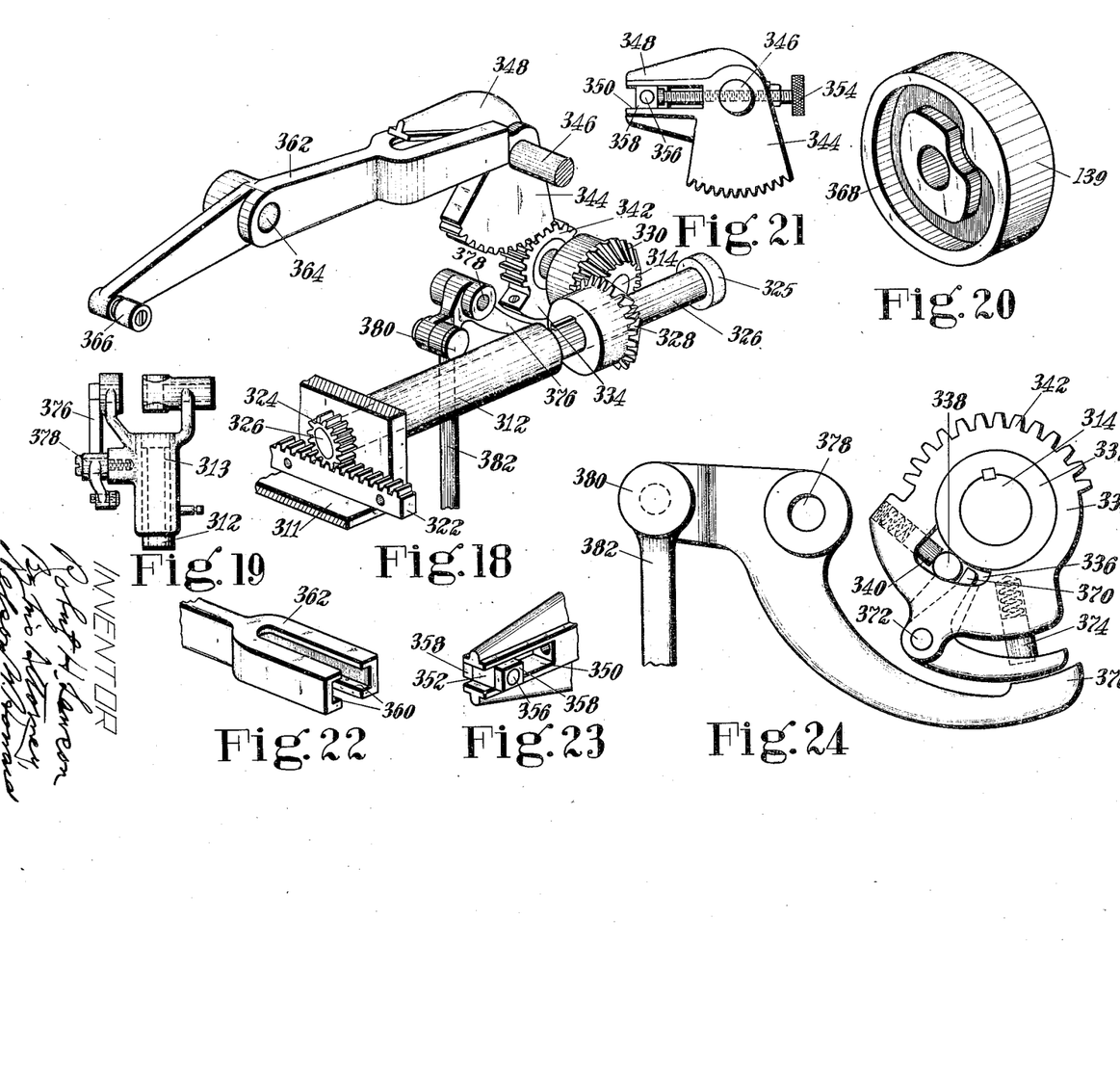
Fig. 18 is a perspective view of the feeding mechanism.
Fig. 19 is a plan view on a smaller scale of certain of the parts which support the feeding mechanism and jack.
Fig. 20 is a perspective view of the feed cam.
Figs. 21, 22 and 23 are detail views of parts of the feeding mechanism through which the extent of feeding movement may be adjusted.
Fig. 24 is a side elevation of part of the feeding mechanism and particularly of the devices through which that mechanism may be rendered inoperative as desired.

For feeding the shoe the machine embodies mechanism shown particularly in Figs. 18 to 23 comprising a rack 322 fixed to the slide 264 and meshing with a pinion 324 upon the end of a shaft 326 rotatable in the sleeve 312 and provided with a stop collar 325. Splined upon this shaft is a bevel gear 328 meshing with a similar gear 330 fixed to the shaft 314 which shaft has also fixed to it a sleeve 332 driven step by step through a clutching device from a concentric sleeve 334. The latter is provided with a tapered recess 336 within which is a movable roll 338 normally held in wedging engagement between the outside surface of the sleeve 332 and the outer wall of slot 336 by a spring pressed pin 340. The sleeve 334 is also provided with a gear segment 342 meshing with another segment 344 secured to a short shaft 346. Connected with the segment 344 is a bifurcated crank arm 348 having a slot 350 in which slides a block 352 which may be adjusted in the slot by a headed screw 354. A pin 356 passing through the block has a sliding fit therein and carries at each of its outer ends a block 358 secured to the pin. The blocks 358 are slidable in guideways 360 in the bifurcated rear end of a lever 362 fulcrumed at 364 and carrying at its forward end a roll 366 running in the cam path 368 of the cam 139 previously mentioned. In order to render the feeding mechanism either operative or inoperative at the will of the attendant, means is provided for interrupting the connections between cam 139 and the rack 322. As shown particularly in Fig. 24, this means comprises a bell crank lever 370 pivoted at 372 upon the sleeve 334 and normally held by a spring pressed pin 374 just out of contact with the locking roll 338. However, this lever 370 may be swung, against the resistance of the spring pressed pins 340 and 374, to move the roll 338 into the wider portion of the slot 336 so that the oscillation of sleeve 334 will no longer effect movement of the sleeve 332. As illustrated, this unlocking mechanism comprises a bell crank lever 376 pivoted at 378 upon a boss upon the bearing 313 as shown in Fig. 19. The forward end of this lever is pivotally connected by headed pin 380 to the upper end of a treadle rod 382. With this construction, whenever the attendant wishes to discontinue the feeding of the shoe he depresses the treadle rod 382, and moves the roll 338 into inoperative position thus interrupting the driving connection between the main power shaft 6 and the jack.

By continuing the depression of the rod 382 the bell crank lever 370 will be turned until the resistance to turning is greater than the tension of spring 316 whereupon the further depression of the rod causes the jack to be swung down about the shafts 314, 315 into inoperative or shoe receiving position. Similarly, after the machine has been stopped automatically as will be shortly described, the attendant may, through the depression of the treadle rod 382 as just described, disconnect the jack from its feeding mechanism and depress it so that it, with its slide bar 264, may be returned to initial position substantially as illustrated in Fig. 1.

Figures 25, 26, 27, 28:
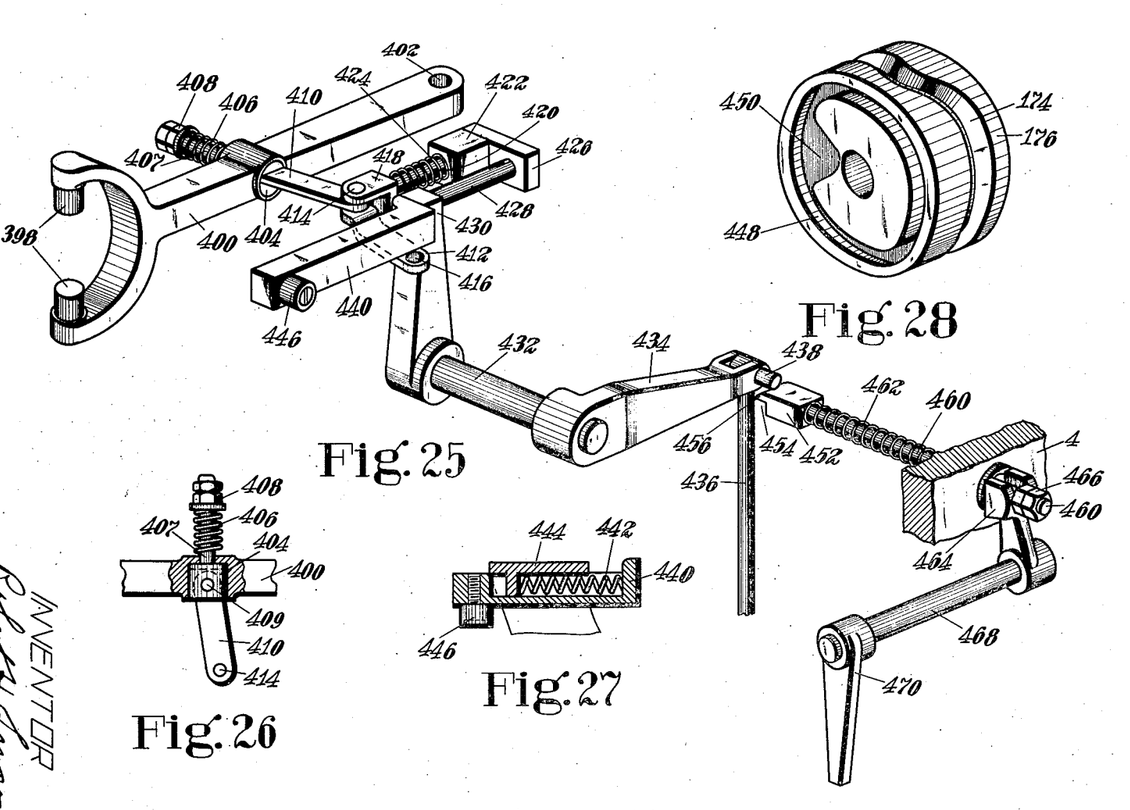
Fig. 25 is a perspective view of the driving and stopping mechanism.
Figs. 26 and 27 are detail views of certain yielding connections forming part of this driving and stopping mechanism.
Fig. 28 is a perspective view of the cam which controls the stopping of the machine, the cam path through which the looper is operated being shown also.

Referring now to the mechanism through which the machine is driven and also is automatically stopped, rod 46 and shaft 56 support a bar 386 (Fig. 2) carrying a stationary frusto conical ring brake 388. The main power shaft 6 has splined upon it a co-operating frusto conical clutch member 390 which may be slid in one direction along the shaft 6 to engage the brake 388 and thus quickly stop the machine or it may be slid in the opposite direction to bring its outer frusto conical surface into frictional engagement with a corresponding surface 392 upon the inside of a driving pulley 394 loose on the shaft. In the hub of the clutch member 390 is a circular groove 396 engaged by studs 398 upon the bifurcated end of a lever 400 pivoted upon the frame at 402 (Fig. 25). Movable within a circular opening upon one side of lever 400 is a cylindrical block 404 (Fig. 26) normally held against the bottom wall of the opening in the lever by a spring 406 surrounding a stem 407 projecting from the block 404. The spring bears against the side of the lever and against a nut 408 upon the threaded end of the stem 407. Pivoted at 409 in the block 404 is a link 410 which with a similar link 412 to which it is pivoted at 414 constitutes a toggle. The link 412 is pivoted upon the machine frame at 416. The central pivot 414 of the toggle is carried by the head 418 of a rod 420 sliding in a projection 422 on the frame. A spring 424 interposed between the head 418 and the projection 422 tends to move the toggle into approximately straightened position. The rod 420 is connected by a bar 426 to another rod 428 bearing against the upper end of an arm 430 fixed upon a rock shaft 432 which, at its other end, carries another arm 434 connected to a second treadle rod 436 through a pin 438. Also bearing against the upper end of arm 430 is a slide 440 normally pressed outward toward the arm 430 by a light spring 442 lying in a socket in the slide 440 (Fig. 27) and resting at one end against a bracket 444 projecting from the frame of the machine. The slide 440 carries a roll 446 which runs in a cam path 448 of the cam 176 previously mentioned. As shown particularly in Fig. 28 the inner wall of cam path 448 is cut away or interrupted at the point 450, so as to permit the slide 440 to be moved toward the axis of the cam by the heavy spring 424 and against the resistance of the light spring 442 and thus, at a predetermined point in the cycle of operations, throwing the clutch member 390 out of engagement with the driving pulley 396 and into engagement with the brake 388. The provision of the spring 406 in the connections between the treadle rod 436 and the clutch makes it possible to swing the rock arm 430 backward far enough to cause the roll 446 under the action of spring 442 to come into contact with the outer wall of the cam path 448 even if the clutch member 390 comes into firm engagement with the conical surface 392 before the roll has been wholly withdrawn from the recess 450. Moreover, this yielding connection provides means for adjusting the driving pressure between said clutch parts 390 and 392 and compensates for any wear of these parts. Preferably the recess 450 in the cam path is so arranged axially of the shaft that it permits the machine to stop only at a point in the cycle of operations when the needle is retracted from the work and the gripping jaws are open. As shown in Fig. 2, the clutch is closed and the machine is running while the parts are shown in Fig. 25 in the position which they occupy just before the treadle rod 436 is depressed to start the machine. The means for maintaining the machine in operation and then, when the work upon a shoe is completed, for stopping the machine automatically includes a block 452 (Fig. 25) having a rabbet 454 in its lower side and having its upper end beveled at 456. This block is slidable in a bearing 458 projecting from the frame 4 (Fig. 2) and is carried upon the end of a rod 460. The block and rod are normally pressed to the left as shown in Fig. 25 by a spring 462 but they may be moved in the opposite direction through a forked arm 464 straddling the rod and engaging nuts 466 thereon. This arm 464 is secured to a rock shaft 468 carried by the head 4 and having at its forward end another arm 470 which projects downward into the path of a stop 472 secured to the jack, as shown particularly in Fig. 3.

When the machine is started by the depression of the treadle rod 436 the end of pin 438 acting upon the beveled surface 456 moves the block 452 to the right and, after the pin has passed down beyond said surface, the spring 462 again moves the block to the left so that the pin is retained in the rabbet 454 and the clutch is automatically held in driving position. The stop 472, which is preferably adjustable, is so positioned upon the shoe support that it will shift arm 470 to the left when the side lasting operation has been completed whereupon, as soon as the recess 450 in the cam path comes opposite the roll 446, the clutch, under the action of spring 424, will be opened and the brake applied, bringing the machine quickly to rest.

The manner in which the illustrated machine will preferably be operated in side lasting a shoe has been indicated in connection with the description of the various parts, but, recapitulating, the shoe is presented to the machine with the upper and insole assembled upon a last. According to certain applications of the invention, the toe and heel ends of the upper may have been already lasted in any usual or suitable manner but, preferably, said ends are preliminarily molded to approximately their final shape and to produce inturned flanges, the heel flange being permanently secured to the insole, all before the parts are assembled upon the last. As indicated in Fig. 1 and as set forth also in the Warren application heretofore mentioned, the inturned toe flange terminates in an upstanding flange so that in assembling the parts upon the last these toe flanges of the upper are caused to fit or interlock with the feather and rib of the insole. While it is contemplated that the heel of the insole may be fixed against lateral shifting on the last bottom by a locating pin, as disclosed in the said Warren application, the present applicant has discovered that it is possible to dispense with the usual tacks or other means for securing the insole to the last not only because of the interlocking at the toe just described but also because the lasting is performed simultaneously at opposite sides of the shoe so that there is substantially no tendency to displace the insole laterally on the last bottom.

With the upper and insole thus assembled on the last and the jack of the machine in depressed or shoe receiving position with its sleeve 274 in inclined position, the hole 18 in the last is placed over the last pin 272 and the sleeve 274 swung into upright position about its pivot 276, bringing the heel seat of the shoe beneath the abutment 310. The toe rest 250 is then slid along the bar 264 into operative engagement with the toe of the shoe, the roll 266 locking it in such position. The spring 282 holding the heel seat of the shoe against the abutment 310, the shoe is clamped in the jack through the action of roll clutch 288. The attendant, by releasing the treadle rod 382, allows the jack to be swung by spring 316 about shafts 314, 315 into raised position determined by the channel guides 20 and the foot 66. By continuing to exert a slight downward pressure upon the rod 382, the attendant maintains roll clutch 338 inoperative so that the jack and shoe may be moved and located in precisely the proper longitudinal position relative to the operating tools. The attendant may move the channel guide supports 22 toward each other by hand while he is locating the channel guides 20 correctly in the inside angle of the sewing rib 14. Since the stop 472 is mounted upon the toe rest, it will be adjusted approximately to the proper position for the particular shoe being operated upon without special attention upon the part of the operator but it may also be further adjusted manually. The parts will then occupy substantially the position shown in Figs. 1 and 25, whereupon the treadle rod 436 will be depressed, the pin 438 will seat itself within the rabbet 454 and the machine will start into operation and continue in operation until thrown out either by the attendant or automatically through stop 472 and arm 470. While the machine is running, the gripping and sewing mechanisms will progressively last the two sides of the shoe as already explained, the shoe being fed step by step between successive operations of said mechanisms.

It is to be understood that, as already suggested, the invention is not limited in scope to the particular embodiment thus described by way of illustration but is capable of embodiment in various other specific forms and, indeed, certain features of it may be embodied in machines for performing substantially different operations within the scope of the invention and of the appended claims.

Therefore, what I claim as new and desire to protect by Letters Patent of the United States is:

1. A shoe machine comprising an abutment for engaging the bottom of a shoe, a pair of guides spaced longitudinally from said abutment and constructed and arranged to engage said bottom at opposite sides of its longitudinal median line, a work support movable about an axis located in proximity to the shoe bottom and between said abutment and guides, and yielding means sustaining the support against said abutment and guides.

2. A shoe machine comprising three vertically immovable abutments spaced apart and constructed and arranged to engage the bottom of a shoe, in combination with a work support movable to maintain said bottom in engagement with each of said abutments.

3. A shoe machine comprising a work support, three vertically immovable abutments spaced apart and constructed and arranged to engage the bottom of a shoe carried by said support, two of said abutments being movable laterally relatively to the third so as to bear on said bottom adjacent to the opposite margins of the shoe whatever its width, in combination with means acting upon said support and constantly tending to maintain said bottom in engagement with each of said abutments.

4. A shoe machine comprising three abutments constructed and arranged to engage the bottom of a shoe, a work support supported for movement about an axis lying approximately in the general plane of said bottom, in combination with means for maintaining said bottom in engagement with said abutments, and mechanism for operating upon the shoe.

5. A shoe machine comprising three abutments constructed and arranged to engage the bottom of a shoe, a work support supported for movement about a plurality of axes lying approximately in the general plane of said bottom, in combination with means for maintaining said bottom in engagement with said abutments, and mechanism for operating upon the shoe.

6. A shoe machine comprising a work support supported on a plurality of trunnions for movement about two axes at an angle to each other and lying approximately in the general plane of the bottom of a shoe carried by said work support, in combination with mechanism for operating upon the shoe.

7. In a shoe machine, the combination of an abutment constructed and arranged to engage the bottom of a shoe, a shoe support comprising toe and heel rests and a pair of axially alined trunnions connected respectively to said rests with the axis of said trunnions lying approximately in the general plane of the bottom of the shoe, in combination with means for maintaining said bottom in engagement with said abutment, and mechanism for operating upon the shoe.

8. In a shoe machine, a shoe support having trunnions movable about an axis lying approximately in the general plane of the bottom of a shoe carried by said support, in combination with mechanism for operating upon the shoe.

9. In a shoe machine, a shoe support comprising toe and heel rests, one of which is movable toward and from the other longitudinally of the shoe, and a pair of axially alined trunnions connected respectively to said rests, and mechanism for operating upon the shoe.

10. In a shoe machine, a shoe support having axially alined trunnions, the axis of which lies approximately in the longitudinal axis of the bottom of a shoe carried by said support, two abutments constructed and arranged to engage said bottom at opposite sides of said axis, in combination with mechanism for operating progressively along the margin of said bottom.

11. In a shoe machine, a shoe support having supporting trunnions or shafts mounted for movement about two axes at an angle to each other and lying in proximity to the longitudinal and transverse axes of the bottom of the shoe, in combination with two abutments constructed and arranged to engage said bottom at opposite sides of one of said axes, and mechanism for operating progressively along the margin of said bottom.

12. In a shoe machine, a shoe support having trunnions mounted for movement about a longitudinal axis lying approximately in the general plane of the bottom of a shoe carried by said support and also movable about another axis substantially at right angles to said longitudinal axis, in combination with an abutment constructed and arranged to engage the bottom of the shoe, and mechanism for operating progressively along said bottom.

13. In a shoe machine, a shoe support having trunnions movable about a longitudinal axis lying approximately in the general plane of the bottom of a shoe carried by said support, two abutments constructed and arranged to engage said bottom at opposite sides of said axis, in combination with mechanism constructed and operating to work an upper over a last carried by said shoe support, and mechanism for transferring the point of operation along the margin of said bottom.

14. In a shoe machine, a carrier, a shoe support mounted in said carrier for free movement about an axis which lies approximately in the longitudinal axis of the bottom of a shoe carried by said support, two abutments constructed and arranged to engage said bottom at opposite sides of said axis, means constantly tending to maintain said bottom in engagement with each of said abutments, in combination with mechanism for operating progressively along said bottom.

15. In a shoe machine, a carrier, a shoe support mounted in said carrier for free movement about an axis located in proximity to the bottom of a shoe carried by said support, a plurality of vertically immovable abutments spaced apart and constructed and arranged to engage said bottom, in combination with means acting upon said support and constantly tending to maintain said bottom in engagement with each of said abutments.

16. A shoe machine comprising three vertically immovable abutments spaced apart and constructed and arranged to engage the bottom of a shoe, in combination with a shoe support freely movable about an axis located in proximity to the shoe bottom, and means acting upon said support and constantly tending to maintain said bottom in engagement with each of said abutments.

17. A shoe machine comprising three vertically immovable abutments spaced apart and constructed and arranged to engage the bottom of a shoe, in combination with a shoe support freely movable about two axes at an angle to each other, and yielding means sustaining the support against all three of said abutments.

18. A shoe machine comprising a work support having trunnions mounted for swinging movement about a substantially horizontal axis which approximately coincides with the longitudinal axis of the bottom of a shoe carried by said support, a pair of guides, means tending to maintain said guides both laterally and vertically in continuous engagement with a rib adjacent to opposite edges of a sole carried by said support, in combination with mechanism for operating upon the sole, and automatic means for feeding the support.

19. A shoe machine comprising a work support mounted for movement about two axes approximately at right angles to each other, three abutments constructed and arranged to engage and position a shoe carried by said work support, mechanism for relatively moving said support and abutments to maintain them in operative relation, in combination with mechanism for operating upon the shoe, and automatic means for feeding the support.

20. A lasting machine having, in combination, a work engaging member provided with a guide, a pair of gripping jaws, a single fulcrum upon which said jaws are pivoted and which engages said member, and co-operating mechanism to cause first relative movement of said jaws to grip an upper assembled upon a last and then joint movement of the jaws to stretch the upper and carry it inward over the last.

21. A lasting machine having, in combination, a power shaft, a swinging support provided with an angular guide slot, a channel guide carried by said support, a pair of gripping jaws pivoted on a fulcrum guided by said slot, the jaws being provided respectively with non-parallel slots, a pin slidable in the latter, a yielding friction device engaging one of the jaws, and connections from the power shaft to said pin operating to cause first relative movement of said jaws to grip an upper assembled on a last and then joint movement of the jaws to stretch the upper and carry its margin inward over the last.

22. A shoe machine having, in combination, a central power shaft, a shoe support, a pair of tool supports fulcrumed at opposite sides of said shaft and movable toward and from each other transversely of the shoe, tools mounted on said tool supports, operating connections from said power shaft to said tools, and mechanism also actuated from said shaft for moving said shoe support to transfer the point of operation along the shoe.

23. A shoe machine of the class described having, in combination, a central power shaft, a single jaw actuator mounted thereon, a pair of supports fulcrumed at opposite sides of said shaft and movable towards and from each other transversely of a shoe being operated upon, two pairs of jaws respectively carried by said supports, and an equalizing lever operatively connected independently of said supports to said actuator and to both pairs of jaws, said actuator and parts being constructed and operated to grip an upper assembled upon a last and stretch it over the last.

24. A shoe machine for forming stitches constructed and operating to sew an upper to a sole comprising a central power shaft, a pair of supports fulcrumed at opposite sides of said shaft, a pair of curved needles, a pair of needle segments respectively carrying the needles and pivoted to said supports, and actuating connections between said power shaft and said segments.

25. A machine of the class described having, in combination, a primary power shaft, a movable support, sewing devices constructed and operating to form a lock-stitch seam and mounted on said support, and mechanism for actuating said devices from said shaft in a substantially uniform manner in the different positions of said support.

26. A machine of the class described having, in combination, a primary power shaft, a swinging support, sewing devices for forming a lockstitch seam mounted on said support and including a curved needle, a thread carrying looper and a thread retaining finger, and mechanism for actuating said devices from said shaft including connections movable concentrically with the axis of said support.

27. A machine of the class described having, in combination, a primary power shaft, a swinging support, a channel guide mounted upon said support, sewing devices for forming a lockstitch seam mounted upon said support and including a curved needle, a thread carrying looper and a thread retaining finger each mounted on said support, said looper and finger being movable in planes at right angles to the path of the needle, and means for actuating said devices from said shaft.

28. A shoe machine having, in combination, a power shaft, a shoe support mounted to swing to and from operative position, one or more tools for operating upon the shoe, and connections between said shaft and support, including a clutch constantly under the control of the operator and an element co-axial with the axis about which said support swings, for producing feeding movement of the support.

29. A shoe machine having, in combination, a power shaft, one or more tools for operating upon a shoe, a shoe support mounted to swing to and from operative position, and connecting mechanism between said shaft and said support, including an element co-axial with the axis about which the support swings, for producing feeding movement of the support, and means under the control of the operator both for rendering said connections inoperative and for swinging said support out of operative position.

30. A shoe machine having, in combination, a power shaft, one or more tools for operating upon a shoe, a shoe support mounted to swing to and from operative position and also to move longitudinally to feed the shoe, and connecting mechanism between said shaft and said support, including an element co-axial with the axis about which the support swings and also a roll clutch movable either into operative position to cause an intermittent feeding movement of the support or into inoperative position to permit independent movement of the support.

31. In a shoe machine, a frame, a tool carried thereby, and shoe supporting mechanism comprising a support, movable relatively to the frame to and from operative relation to the tool, and toe and heel rests for a shoe respectively pivoted to said support and constructed and arranged to rock about an axis lying approximately along the longitudinal median line of the bottom of the shoe.

32. A shoe jack having, in combination, a support, relatively movable toe and heel rests carried thereby, the heel rest being provided with an abutment to overlap the heel seat of a shoe, a spring pressed last pin pivoted on said support and tending to maintain the shoe against said abutment, a lock for positively holding the pin in such position, and means for releasing the lock as the pin is swung about its pivot.

In testimony whereof I have signed my name to this specification.

ROBERT HILLDORF LAWSON.